UNITED STATES PATENT OFFICE.

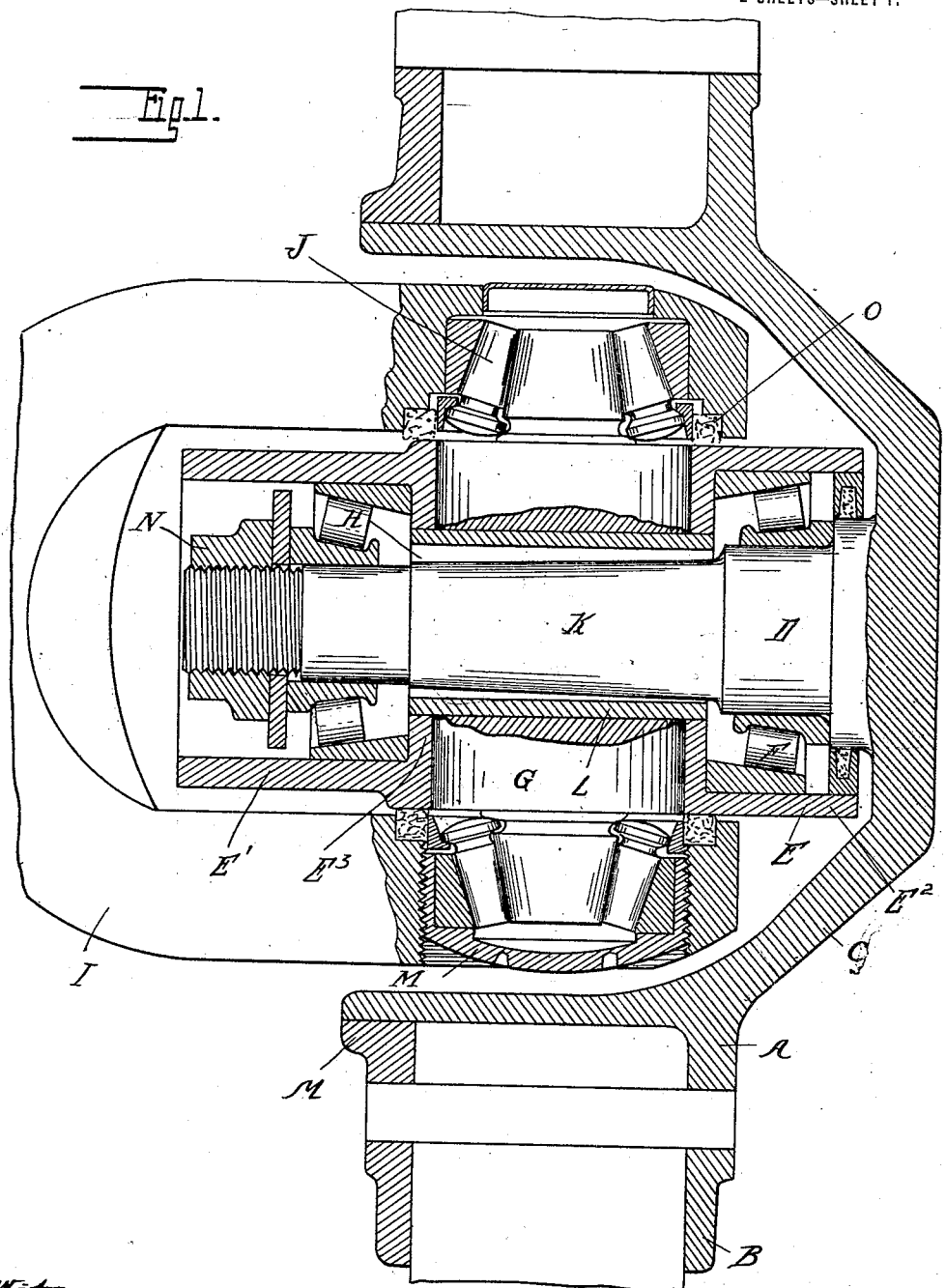

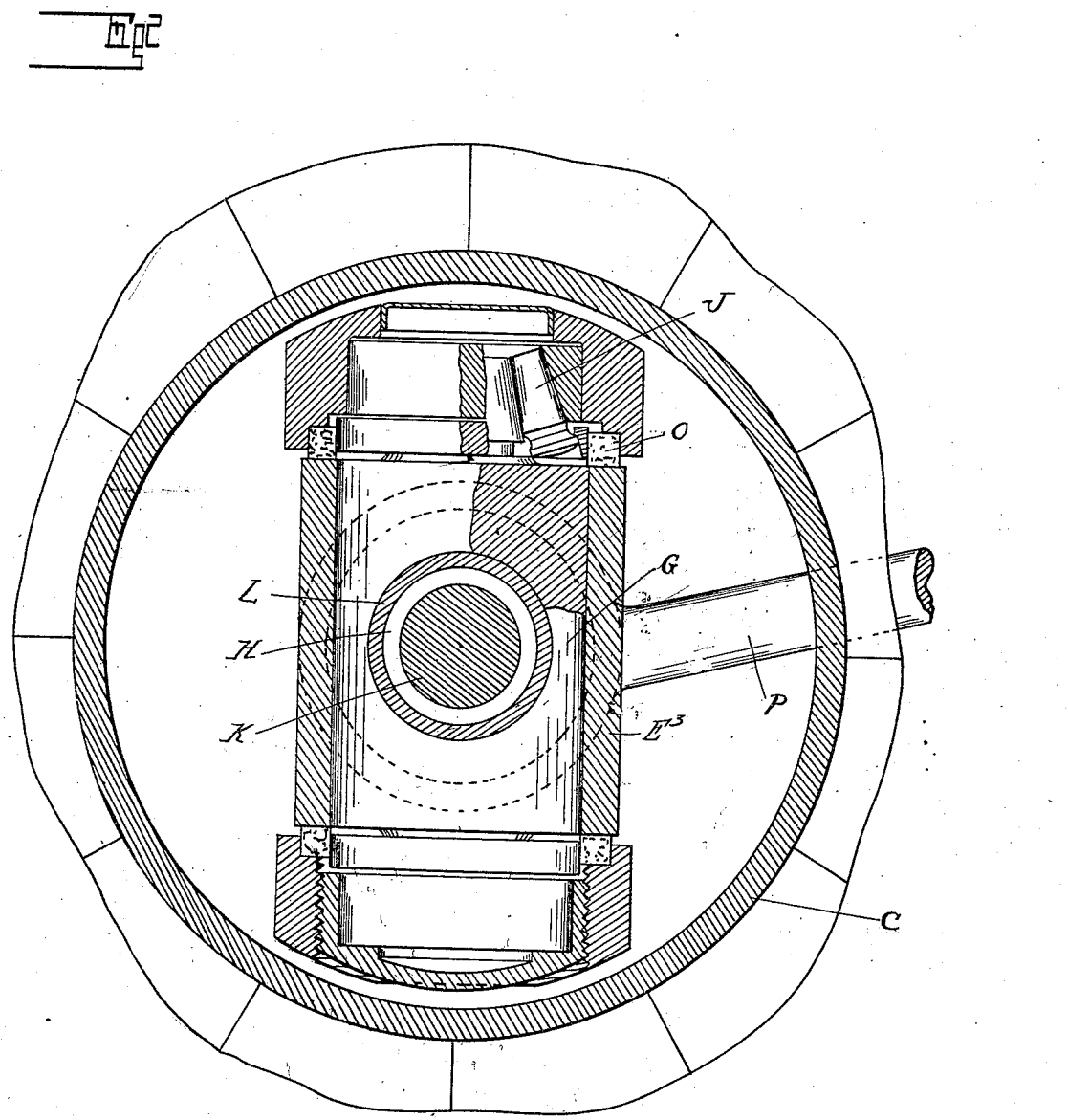

HENRY L. BOCK, OF TOLEDO, OHIO, ASSIGNOR TO WILLIAM EMIL BOCK, OF TOLEDO, OHIO.

VEHICLE-WHEEL.

1,177,597.  Specification of Letters Patent.  Patented Apr. 4, 1916.

Application filed June 28, 1913. Serial No. 776,270.

*To all whom it may concern:*

Be it known that I, HENRY L. BOCK, a citizen of the United States of America, residing at Toledo, in the county of Lucas and State of Ohio, have invented certain new and useful Improvements in Vehicle-Wheels, of which the following is a specification, reference being had therein to the accompanying drawings.

The invention relates to vehicle wheels, which are adapted for use in steering, and it is one of the objects of the invention to obtain a construction in which the pivot of the steering knuckle is in the central plane of the wheel.

It is a further object to obtain a construction of mounting of the wheel which may be compactly arranged within the hub thereof, as hereinafter set forth.

In the drawings:

Figure 1 is a vertical central section through the hub of the wheel; Fig. 2 is a vertical central section at right angles to the plane of Fig. 1.

A is the center or hub portion of the wheel, which is fashioned to provide spoke-engaging portions B and a centrally recessed portion C.

D is a stub axle arranged centrally within the recess and preferably integral with the portion C.

E is a sleeve or casing journaled upon the stub axle D, preferably by roller bearings F at opposite ends thereof.

G is a pin extending transversely through the center of the casing E and being itself centrally apertured at H for the passage of the stub axle.

I is a bifurcated arm in which the pin G is pivoted, preferably through the medium of roller bearings J.

To facilitate assembling the parts thus far described, the construction is such that it may be engaged in the following manner: The aperture H in the pin G is of greater diameter than the portion K of the stub axle which passes therethrough. The sleeve or casing E which is mounted on the stub axle D is formed with the alined cylindrical portions E' and $E^2$ at opposite ends thereof for respectively receiving the roller bearings F. Intermediate these end portions is a cylindrical portion $E^3$ having its axis transverse to that of the portions E' and $E^2$ and its bore of a size to receive the pin G. The pin G is transversely bored for the passage of the portion K of the stub axle D with sufficient clearance for the insertion of a hollow pin or sleeve L, which latter engages alined and corresponding apertures in the walls of the portion $E^3$ to hold said pin from disengagement. The pin G is engaged with the bifurcated arm I at the same time that it is engaged with the portion $E^3$ of the casing E, one of the furcations being apertured for the passage of said pin. The other furcation is recessed for the reception of the roller bearing J, while a screw cap M in the first furcation forms a means for holding the other roller bearing and for adjusting to take up lost motion or wear. The roller bearings F are engaged with the portions E' and $E^2$ of the casing E before the insertion of the stub axle D therein, and a lock nut N engaging a threaded end portion of the stub axle forms a means of adjustment.

In assembling the parts, the bearing J is placed in the furcation of the arm I, the casing E is slid between the furcations, the pin G is then inserted through one of the furcations and the cylindrical portion $E^3$ of said casing. The sleeve L is next inserted through one of the portions E and $E^2$ to lock the pin G from disengagement, the bearing J is then placed in the furcation through which the pin is entered and is adjusted by the cap M, after which the bearings F are placed in the cylindrical portions E' and $E^2$ of the casing, and the stub axle D is inserted therein and then locked by the nut N. After complete assembly, all of the parts are securely fastened against accidental displacement and are compactly arranged within the hollow hub. Dust and oil guard gaskets O may be placed between the furcations of the arm I and the ends of the portion $E^3$ as indicated in Fig. 1.

In operation, the wheel may be turned by rocking the sleeve or casing E upon the pin G by any suitable actuating means such as the rock arm P. This movement will be permitted by the clearance between the bifurcation I and the recess C, and, as the axis of the pin G is in the central plane of the wheel, this turning may be effected with little resistance.

What I claim as my invention is:

1. A wheel, comprising a recessed hub portion, a stub axle extending from one side of said hub inward centrally through said recess, a casing for engaging said stub axle, a bifurcated axle arm for embracing said casing, and a pin insertible through a transverse aperture in said casing to form a trunnion connection with said bifurcated axle, said pin being centrally apertured for the passage of said stub axle therethrough.

2. In a wheel, a hub provided with a central stub axle and an annular recess surrounding the same, a casing for engaging said stub axle within said recess, a bifurcated axle embracing said casing within said recess, a pin insertible transversely through registering apertures in said axle and casing to form a trunnion connection therebetween, said pin being transversely apertured for the passage of said stub axle therethrough, and a hollow pin or sleeve insertible longitudinally of said casing through said aperture in the pin providing clearance for said stub axle and forming a securing connection between said pin and casing.

3. A wheel, comprising a hollow hub having a stub axle projecting centrally therethrough, a cylindrical casing sleeved upon said stub axle, bearings secured in opposite ends of said casing engaging said axle, a bifurcated axle embracing said casing, a pin insertible through alined apertures in said bifurcated axle and casing to form a trunnion connection therebetween, said pin being transversely apertured for the passage of said stub axle, and a hollow pin or sleeve insertible longitudinally through said casing and aperture in said pin to form a securing connection therebetween providing clearance for the stub axle.

4. In a wheel, a hub recessed from one side and having an outwardly-projection web on the other side, a stub axle projecting inwardly from said web portion centrally within said recess, a cylindrical casing surrounding said stub axle and provided with a transversely-extending cylindrical aperture, bearings engaging opposite end portions of said cylindrical casing and the stub axle, a bifurcated axle arm embracing said casing, a pin insertible through an aperture in one of the furcations of said axle arm and the registering transverse aperture in said casing, being transversely centrally apertured for the passage of said stub axle therethrough, anti-friction bearings engaging the end portion of said pin and the respective furcations of said axle, and a hollow pin or sleeve insertible longitudinally through said casing and the aperture in said pin to lock the latter to said casing and providing clearance for said stub axle.

5. A wheel comprising a hub provided with a central stub axle and an annular recess surrounding the same, a cylindrical casing sleeved upon said stub axle, bearings secured in opposite ends of said casing engaging said axle, an axle embracing said casing, a pin insertible transversely through registering apertures in said axle and casing to form a trunnion connection therebetween, said pin being transversely apertured for the passage of said stub axle therethrough, bearings secured around opposite ends of said pin and engaging the axle embracing the casing, and means for adjusting the play in all of said bearings.

In testimony whereof I affix my signature in presence of two witnesses.

HENRY L. BOCK.

Witnesses:
R. F. SCHNEIDER.
A. C. BAY.